March 2, 1948.  F. D. SCHOTTLAND  2,437,212
ELECTRIC CONDENSER AND METHOD FOR MAKING THE SAME
Filed Dec. 23, 1942  2 Sheets-Sheet 1
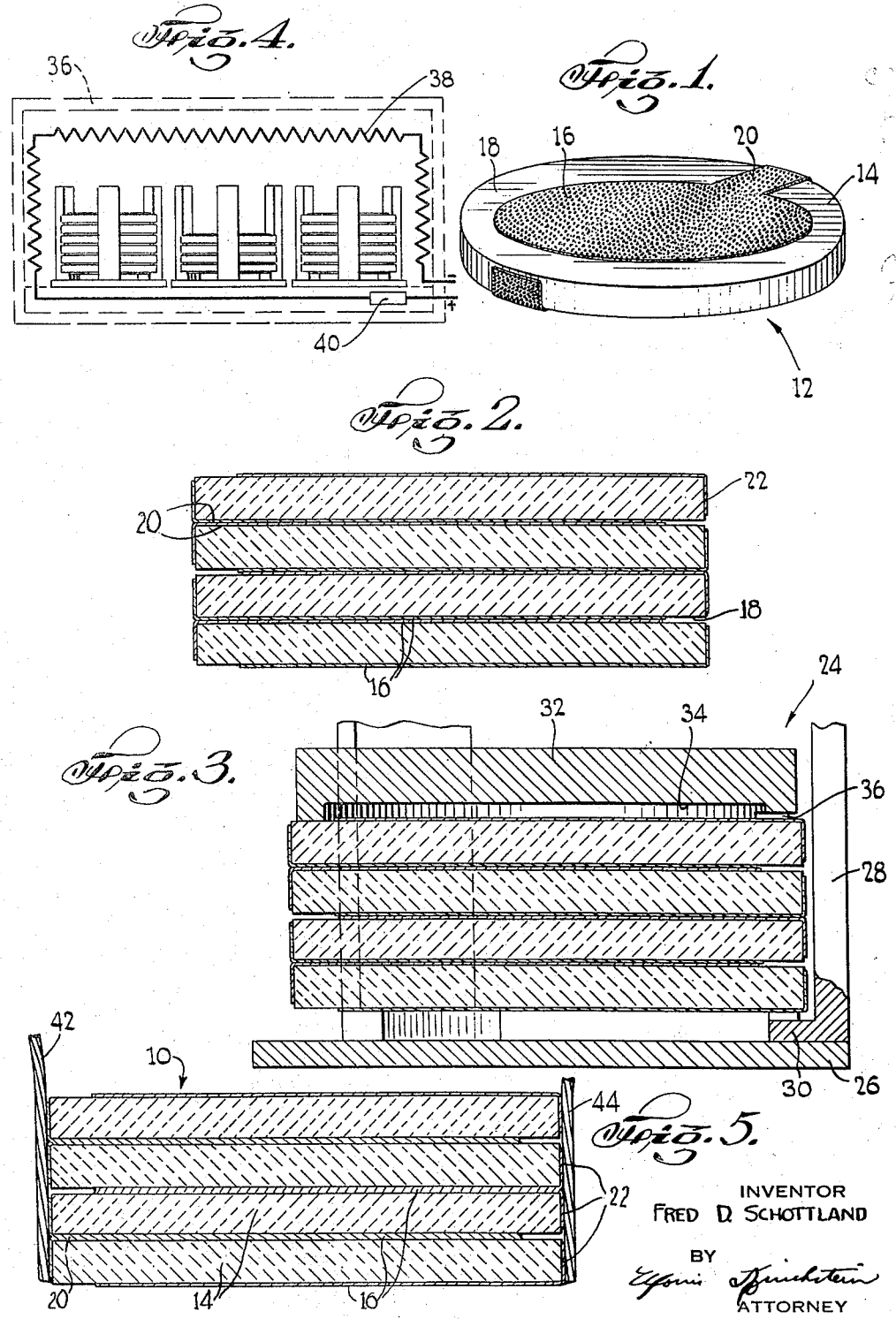
INVENTOR
FRED D. SCHOTTLAND
BY
ATTORNEY March 2, 1948.  F. D. SCHOTTLAND  2,437,212
ELECTRIC CONDENSER AND METHOD FOR MAKING THE SAME
Filed Dec. 23, 1942  2 Sheets-Sheet 2
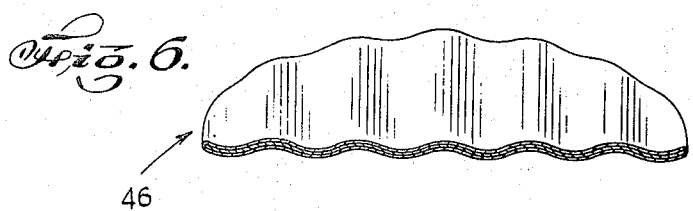
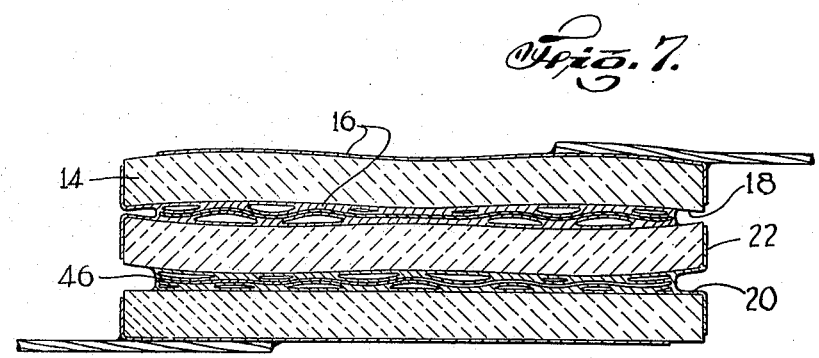
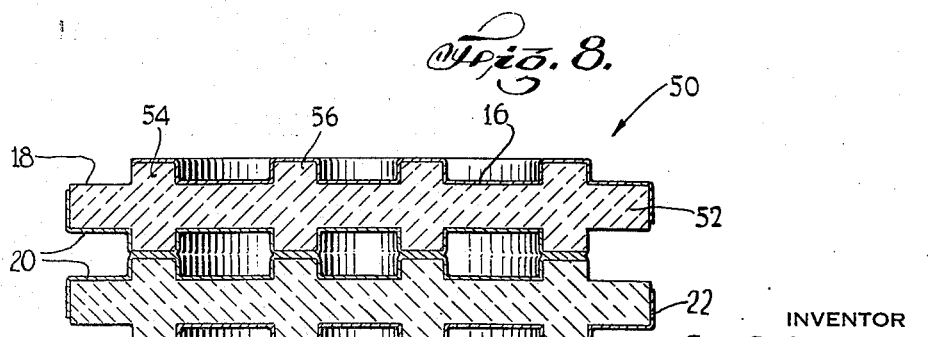
INVENTOR
FRED D. SCHOTTLAND
BY
ATTORNEY Patented Mar. 2, 1948

2,437,212

UNITED STATES PATENT OFFICE 2,437,212

ELECTRIC CONDENSER AND METHOD FOR MAKING THE SAME

Frederic D. Schottland, Forest Hills, N. Y.

Application December 23, 1942, Serial No. 469,864

12 Claims. (Cl. 175—41)

This invention relates to electric condensers and to a method for making the same. More specifically, the invention pertains to condensers of the type which include a plurality of laminae each of which comprises a dielectric sheet having metallic deposits on opposite surfaces thereof.

Heretofore these laminae have been singly used in electric circuits. Attempts have been made to assemble a plurality of laminae into a multiple unit which has a larger capacity, a greater current carrying capability, or a greater voltage breakdown rating, or all three; but up to the present time such units have been unduly bulky, expensive, and inefficient. It is the main object of the present invention, accordingly, to avoid these drawbacks and provide an inexpensive method for making compact and highly efficient condensers comprising a stack of such laminae.

The laminae include both mica sheets and ceramic plates, the tendency being to use ceramic plates because of their high dielectric constants. In efforts to stack a plurality of ceramic plates several factors have combined to render the methods employed impractical. Such factors have included the inherently fragile nature of the ceramic plate which prevented the use of large pressures in holding the stacked plates together, the uneven surfaces of the ceramic plates which prevented contiguous plates from making plane contact and tended to induce corona discharge, and the degradation of power factor which has heretofore always resulted when ceramic plates of the character under discussion were assembled into stacks. It is therefore another object of the invention to provide a commercially practical method of making a low loss condenser comprising a stack of coated ceramic plates.

A further object of the invention is to provide a condenser comprising a plurality of stacked metallic coated ceramic plates which are held to each other without the aid of mechanical expedients such as clamps, casings, or the like.

An additional object of the invention is to provide a condenser comprising a plurality of stacked metallic coated ceramic plates, the coatings of which are autogenously welded to each other.

Yet another object of the invention is to provide a condenser of the character described wherein laminae including dielectrics having very high dielectric constants are employed without appreciably deteriorating the power factor of the condenser.

Other objects of the invention will in part be obvious and in part hereinafter pointed out.

The invention accordingly consists in the features of construction, combinations of elements and arrangement of parts which will be exemplified in the constructions hereinafter described and of which the scope of application will be indicated in the appended claims.

In the accompanying drawings in which are shown various possible embodiments of the invention and wherein like numbers refer to like parts throughout, Fig. 1 is a perspective view of one condenser lamina fabricated from a ceramic plate;

Fig. 2 is a vertical sectional view through a plurality of condenser laminae stacked in preparation for autogenous welding;

Fig. 3 is a vertical sectional view through said stack after the same is positioned in a holding mechanism;

Fig. 4 is a schematic view of a retort in which several stacks are being autogenously welded;

Fig. 5 is a vertical sectional view through a condenser constructed in accordance with and embodying the invention, the several laminae being connected in parallel;

Fig. 6 is a fragmentary perspective view of a special spacer element which is employed when the surfaces of the ceramic plates are not absolutely plane;

Fig. 7 is a vertical sectional view through a condenser embodying my invention and employing a spacer such as shown in Fig. 6, the laminae in this condenser being connected in series;

Fig. 8 is a vertical sectional view through a condenser embodying a modified form of the invention.

In general I carry out the objects of the invention by assembling a plurality of metallic coated dielectric plates in stacked relationship and either in direct contact with each other or with intermediate objects comprising metallic coated elements or wholly metallic elements. The several plates or plates and elements are self-held to each other by flowing molten metal between the same. Preferably this is accomplished by raising the metallic coatings to their melting point while pressed against each other, i. e. by autogenous welding.

Referring now in detail to the drawings and more particularly to Figs. 1 through 5, I have there shown a condenser 10 (Fig. 5) embodying my invention. Said condenser is made by treating a desired number of laminae 12 (Fig. 1) in accordance with the invention.

The laminae 12 may be constructed in any suitable manner well known to the art and may be of circular profile although such shape has no bearing on the invention. They each comprise a plate 14 of a suitable dielectric material as for example mica or a ceramic substance such as titanium dioxide. The illustrated lamina is mainly composed of titanium dioxide and is, therefore, thicker than a sheet of mica. Both the top and bottom surfaces of the plate 14 are partially coated with a metallic deposit which includes a central portion 16 spaced from the rim of the plate 14 to leave a margin 18 therearound. The coating also includes a leg 20 which is integral with and extends away from the central portion 16, spans the margin 18, and extends down and over the plate rim. The depending portions 22 of the legs 20 are for connecting a plurality of the lamina 12 in parallel if desired. The legs 20 on each lamina are connected to central coated portions 16 on opposite surfaces of the ceramic plate 14 and are angularly spaced from each other. If desired, such spacing may be diametrical as shown in Fig. 1 to widely separate the condenser leads, this being of particular advantage when the condenser is used in high frequency circuits.

The lamina may be prepared by any one of the several methods now employed in the art to fabricate the same. For example, the ceramic plate 14 can be press-shaped and baked and the coating may be deposited by spraying on the desired portions of the plate a fluid comprising a volatilizable vehicle in which there is suspended a finely powdered metallic substance. One such fluid is sold to the trade under the name "Silver Spray No. 4253" by the E. I. du Pont de Nemours & Co., Inc. The vehicle of this spray is 65% alcohol and 35% water. The metallic powder suspended in the spray is a low melting silver alloy which fuses at around 500° to 600° C. The ceramic employed for the plate may comprise about 90% by weight of titanium dioxide (TiO$_2$) and about 10% by weight of zirconium titanate (ZrTiO$_4$). It will be understood of course that the foregoing specific substances and proportions are given by way of example only and are in no sense to be construed as a limitation upon the scope of the invention.

It may be mentioned that the peripheral definition of the metallic coatings on the upper and lower surfaces is best obtained by employing a mask during spraying of the ceramic plate.

Although I have described in some detail the method of depositing a metallic substance on the ceramic plate by spraying a powder suspended in a volatile vehicle, it will be understood that other methods of depositing the metallic coating which are now practiced by the art may alternatively be employed. Such methods include hot metal spraying and electrodeposition.

After a plurality of laminae 12 have been prepared they are arranged in stacked relationship with the edges of adjacent plates 14 and the boundaries of juxtaposed metallic coated central portions 16 in substantial registration. The legs 20 of juxtaposed central portions 16 are also disposed in alignment. This stacked condition of the several laminae is shown in Fig. 2. It will be appreciated that the illustrated thickness of the metallic coatings in this figure, as well as in all other figures of the drawings, is exaggerated for the purpose of illustration, as such coatings are actually too thin to appear in the drawings if the same were shown to scale.

Particular attention is called to the fact that although attempts may be made to place the boundaries of the central portions 16 in perfect registration this will not be possible because of minor discrepancies arising from slight differences in the sizes of the plates 14 and slight differences in positioning of the masks during deposit of the coatings 16. This failure to secure perfect registration of the boundaries of the central coated portions 16 is believed to be the cause of the poor power factor heretofore attained when a plurality of laminae of the character described were stacked as shown in Fig. 2 and held in this position by an extraneous fastening or clamping means. It is believed that the air gap which existed because of the imperfect alignment of the boundaries of the coating portion 16 produced a composite dielectric consisting of such air gap and the dielectric plate 14 which have widely different dielectric constants. Where such a condition was present a tendency to corona discharge existed and the same, of course, materially degraded the power factor of the condenser. It will be appreciated that as plates having higher and higher dielectric constants are employed the loss in power factor arising from the foregoing condition will become greater and greater so that all the advantages resulting from using a material having a high dielectric constant are lost.

Pursuant to my invention the drawback just described may be overcome and the several laminae self-held to each other by treating the stacked metallic coated laminae 12 in the following manner:

After the laminae have been stacked as shown in Fig. 2, they are introduced into a holding mechanism 24 (Fig. 3) which comprises a ceramic base 26 having a plurality of circularly arranged upwardly extending ceramic legs 28. The spacing of the legs is such that the rim of the stacked laminae 12 are disposed in a sliding fit against the inner surfaces thereof when said laminae are located in the holding mechanism 24. Lugs 30 extend inwardly from the bottom of the legs 28 to maintain the under surface of the lowermost lamina spaced from the base 26. The radial length of said lugs 30 is less than the width of the margins 18 on said laminae. Furthermore, when the laminae are disposed in the holding mechanism the legs 20 including the depending portions 22 will clear the lugs 30. By employing the foregoing construction and relative disposition of parts, the holding mechanism 24 will be kept out of contact with all the metallic coatings on the laminae.

On the uppermost laminae I dispose a small weight 32, the purpose of which will soon be explained. Said weight has its lower surface provided with a central recess 34 to prevent the weight from contacting the central coated portion 16 of the uppermost lamina. A slot 36 is also formed in the bottom surface of the weight to enable the same to clear the leg 20 of said lamina.

A plurality of holding mechanisms 24, each supporting a predetermined number of stacked laminae, are introduced into a suitable heating device, such for example as a retort 36, in which the temperature of the laminae is raised by electric resistances 38 to the melting point for the metallic coatings. A thermostat 40 is provided to prevent the temperature from rising too greatly above the melting point and thus avoids possible vaporization of the metallic coatings. If desired an inert atmosphere may be maintained inside of the retort during heating of the condensers whereby to prevent oxidization of the molten metallic coatings.

After the condensers have been brought to the desired temperature they are allowed to cool either inside of or outside of the retort 36. The structure of said condensers is then such as is illustrated in Fig. 5. All the contiguous metallic coatings including the central portions 16 and legs 20 will be found to have been autogenously welded. Furthermore, the boundaries of the contiguous and now fused metallic coatings will be found to be in perfect registration. This is believed to be due to the fact that although when in solid state the metallic coatings have a greater affinity for the ceramic plates 14 than for each other, when the metal is in molten condition it has a tendency to agglomerate and this will eliminate discrepancies in the boundaries between contiguous metallic coatings. This tendency towards agglomeration of two contiguous horizontal molten metal layers is so great that it is believed that the layers near the top of the stacked laminae would reduce in size and increase in thickness were it not for the presence of the weight 32. The mass of said weight should therefore be selected with this function in mind. I have found that when the plates are approximately 1½ inches in diameter and 3/32 of one inch in thickness and the compositions of the plate and metallic coatings are as specified earlier in the description, a weight of about three ounces will give highly satisfactory results. A tendency of like degree towards agglomeration does not exist in the vertical portions 22 of the legs which are only of single thickness.

A condenser constructed in accordance with my invention has an extremely low power loss and the power factor thereof is substantially the same as the power factor of a single lamina. Also because of the simple means for holding the lamina to each other the condenser is of minimum size, employs a minimum of material, and is very rugged.

The stacked and welded laminae may be connected in series or parallel depending upon the use to which they are to be put. In Fig. 5 I have illustrated said laminae as connected in parallel. This is accomplished by securing a pair of leads 42, 44 to the depending portions 22 of the legs 20 on opposite sides of the condenser. The leads may be secured in any suitable fashion, as for example by soldering, silver brazing, or by pressing the same against the depending portions 22 during the autogenous welding step practiced in the retort 36.

In the description of the condenser 10 it has been assumed that the upper and lower surfaces of the ceramic plates 14 were substantially plane and parallel by virtue of exercising special care in the production thereof or by subsequently grinding such surfaces. Actually, in the present state of the ceramic art, it is necessary to grind the surfaces. This step, of course, entails a certain additional expense and may be avoided by employing a modified form of my invention, shown in Figs. 6 and 7.

Under present day manufacturing conditions the deviation from plane condition of a ceramic plate 14 can easily be kept relatively slight, in the order of a few thousandths of an inch. When stacking plates having such a contour, I introduce between successive plates a spacer element 46 (Fig. 6). Said elements are of the same plan outline as the central metallic coated portions 16 but are of slightly smaller dimensions. The spacers are made from a metal having a higher melting point than the metal deposited upon the ceramic plates. By way of example, such metal may be pure silver. This metal is coated either by spraying, dipping, or the like with a metallic deposit the same as or similar to that deposited upon the ceramic plates 14. The spacer is corrugated across its entire surface. These corrugations may be of any well known type as for example the transverse corrugations shown, or waffle or radial corrugations. The height of the corrugations is at least equal to the maximum deviation from planeness of the flat surfaces of the ceramic plates 14 for a reason which will soon be apparent. The thickness of the metal comprising the spacer is very slight and may be as little as one third to one half the thickness of the metallic coatings so that said spacer, in reality, comprises nothing but a foil barely heavy enough to maintain its own shape when no external pressure is applied, and which will be crushed or deformed when subjected to a pressure as low as that engendered upon imposition of the light weight 32.

When such spacer elements are inserted between adjacent stacked laminae and the weight 32 placed on top of the stack, the spacers will be crushed where the space between the laminae is at a minimum and will touch the metallic coating 16 where the space between the laminae is at a maximum. This will insure maintenance of an even potential throughout the entire surface of a metal condenser plate during use. It will also solidify the internal structure of the finished condenser. Most important, it will aid in rectifying boundary discrepancies of contiguous metallic coatings 16. This is best shown in Fig. 7 where the edge of the lower spacer 46 is intermediate two ceramic plates 14, between whose rims more than a minimum spacing exists. It is believed that the edge of the spacer which, it will be remembered, is spaced inwardly from the boundary of the coating 16, aids in supporting the expanded meniscus which marks the new boundary of the autogenously welded metallic coatings.

It will be appreciated that by using a corrugated spacer foil, such as described, instead of an excessive thickness of metallic deposit on the plates 14, I am able to prevent undue flow of the molten metal during autogenous welding, while still maintaining uniform boundaries for the coatings on adjacent ceramic plates, and maintaining said coatings contacted over substantial areas thereof.

Greater unevenness of surface can be overcome by employing pairs of overlying spacer foils having the corrugations thereof relatively angularly disposed. However, such use is not to be encouraged, as with it boundary discrepancies do not wholly disappear although they are considerably rectified.

It will be noted that the foil from which the spacer element is fabricated can be a metal which includes at least one element employed in the alloyed metallic coating 16 whereby to create a solid joint upon welding.

In Fig. 8 I have shown a condenser embodying a modified form of my invention and employing an alternative structure for overcoming the irregularity of the upper and lower surfaces of the ceramic plates. Said condenser 50 comprises a plurality of ceramic plates 52, each of which is provided on its upper and lower surfaces with two concentric rings 54, 56. Both the outer and inner rings 54, 56 are of the same height. Such height may be in the order of a few thousandths of an inch and need only be sufficient to clear all unevennesses in the surface of the plate 52. The width of the rings 54, 56 may be the same or different, as desired. The width of the outer ring should be at least such that good contact between two contiguous coatings on adjacent plates may be obtained. The width of the inner rings should be sufficient to prevent warping of the plate 52 during baking. All outer rings are of identical diameter and are identically disposed on the upper and lower surfaces of the plates 52. The outer rings can be used to define the boundaries of the central coating portions 16 disposed on the upper and lower surfaces of the plates 52. The plates 52 are also provided with the usual leg portion and depending rim portions such such as are shown in connection with the flat plate 14 (Fig. 1). Prior to metallic coating of the plates 52, the outer ring 54 and inner ring 56 on each surface are ground down to a common plane. I have found that this operation may be practiced at a relatively low cost and considerably below cost of grinding the entire surface of a flat ceramic plate 14. The plates 52 are assembled in stacked position with the outer rings 54 as close to identic registration as possible and the coatings on the top of said rings are autogenously welded to each other in the same manner as that described with reference to the plates 14. The contact afforded between two outer rings 54 is ample for the frequency at which most electric circuits are designed to operate so that this form of condenser affords a good practical solution for overcoming the difficulty arising from the unevenness of the upper and lower surfaces of ceramic plates, while at the same time aiding accurate boundary registration of the two central coating portions prior to welding.

It will thus be seen that there are provided a method and device which achieve the several objects of this invention and which are well adapted to meet the conditions of practical use.

As various possible embodiments might be made of the above invention and as various changes might be made in the embodiments above set forth, it is to be understood that all matter herein set forth or shown in the accompanying drawings is to be interpreted as illustrative and not in a limiting sense.

Having thus described my invention I claim as new and desire to secure by Letters Patent:

1. A condenser comprising a plurality of stacked ceramic plates, each of whose upper and lower surfaces have metallic coatings of similar sizes and shapes thereon, said coatings having boundary edges, the plates being arranged so that the metallic coatings on juxtaposed faces are in substantial registration, said coatings being fused together so that the edges thereof are exactly registered.

2. A condenser comprising a plurality of stacked ceramic plates, each of whose upper and lower surfaces have metallic coatings of similar sizes and shapes thereon, said coatings having boundary edges, the plates being arranged so that the metallic coatings on juxtaposed faces are in substantial registration, the edges of said coatings being fusedly joined so that they are in exact registration.

3. A condenser comprising a plurality of stacked ceramic plates each of whose upper and lower surfaces have metallic coatings of similar sizes and shapes thereon said coatings having boundary edges, the plates being arranged so that the metallic coatings on juxtaposed faces are in substantial registration and the edges of said coatings being exactly registered by metallic welding.

4. A condenser comprising a plurality of stacked ceramic plates each of whose upper and lower surfaces have metallic coatings of similar sizes and shapes thereon said coatings having boundary edges, the plates being arranged so that the metallic coatings on juxtaposed faces are in substantial registration and the edges of said coatings being exactly registered by autogenous welding.

5. A condenser as set forth in claim 4 wherein the ceramic plates are irregular and wherein a corrugated metallic spacer is disposed between adjacent metallic coatings, said spacer being of a metal having a fusing point higher than the fusing point of the metallic coatings and being itself coated with a metallic coating, the height of the corrugations being at least equal to the greatest deviation from planeness of the upper or lower surfaces of the ceramic plates.

6. A condenser as set forth in claim 4 wherein the upper and lower surfaces of the ceramic plates each have a ring thereon, said surfaces being coated with metal within and over the top of said rings, the plates being arranged so that the rings are in alignment.

7. A method of making condensers which include a plurality of ceramic plates each of whose upper and lower surfaces have metallic coatings of similar sizes and shapes thereon said coatings having boundary edges, said method comprising the steps of assembling the plates in stacked relationship with the metallic coatings on juxtaposed surfaces of adjacent plates in substantial registration and then exactly registering the edges of said coatings by welding the same.

8. A method of making condensers which include a plurality of ceramic plates each of whose upper and lower surfaces have metallic coatings of similar sizes and shapes thereon said coatings having boundary edges, said method comprising the steps of assembling the plates in stacked relationship with the metallic coatings on juxtaposed surfaces of adjacent plates in substantial registration and then exactly registering the edges of said coatings by autogenously welding the same.

9. A method of making condensers which include a plurality of ceramic plates each of whose upper and lower surfaces have metallic coatings of similar sizes and shapes thereon said coatings having boundary edges, said method comprising the steps of assembling the plates in stacked relationship with the metallic coatings on juxtaposed surfaces of adjacent plates in substantial registration and then exactly registering the edges of said coatings by heating said stacked plates to the fusion temperature of said coatings.

10. A method of making condensers which include a plurality of ceramic plates each of whose upper and lower surfaces have metallic coatings of similar sizes and shapes thereon said coatings having boundary edges, said method comprising the steps of assembling the plates in stacked relationship with the metallic coatings on juxtaposed surfaces of adjacent plates in substantial registration and then exactly registering the edges of said coatings by heating said stacked plates to the fusion temperature of said coatings while maintaining said stacked plates in compression.

11. A method of making condensers which include a plurality of ceramic plates each of whose upper and lower surfaces have metallic coatings of similar sizes and shapes thereon said coatings having boundary edges, said method comprising the steps of assembling the plates in stacked relationship with the metallic coatings on juxtaposed surfaces of adjacent plates in substantial registration and then exactly registering the edges of said coatings by heating said stacked plates to the fusion temperature of said coatings while keeping said stacked plates under a slight pressure.

12. A method of making condensers which include a plurality of ceramic plates each of whose upper and lower surfaces have metallic coatings of similar sizes and shapes thereon said coatings having boundary edges, said method comprising the steps of assembling the plates in stacked relationship with the metallic coatings on juxtaposed surfaces of adjacent plates in substantial registration and then exactly registering the edges of said coatings by heating said stacked plates to the fusion temperature of said coatings but not beyond the vaporization temperature thereof.

FREDERIC D. SCHOTTLAND.

REFERENCES CITED

The following references are of record in the file of this patent:

UNITED STATES PATENTS

| Number | Name | Date |
| --- | --- | --- |
| 1,479,315 | Pickard | Jan. 1, 1924 |
| 1,568,918 | Pfiffner | Jan. 5, 1926 |
| 1,706,816 | Pickard | Mar. 26, 1929 |
| 1,721,503 | Priess | July 23, 1929 |
| 1,811,725 | Marckworth | June 23, 1931 |
| 2,141,677 | Ziegenbein | Dec. 27, 1938 |
| 2,157,715 | Meggenhofen | May 9, 1939 |